(12) United States Patent
Benedetti

(10) Patent No.: US 11,675,067 B2
(45) Date of Patent: Jun. 13, 2023

(54) PHASE UNWRAPPING WITH MULTIPLE WAVELENGTHS ON A FLAT TORUS

(71) Applicant: Microsoft Technology Licensing, LLC, Redmond, WA (US)

(72) Inventor: Arrigo Benedetti, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 393 days.

(21) Appl. No.: 16/985,091

(22) Filed: Aug. 4, 2020

(65) Prior Publication Data

US 2021/0356578 A1 Nov. 18, 2021

Related U.S. Application Data

(60) Provisional application No. 63/025,885, filed on May 15, 2020.

(51) Int. Cl.
*G01S 13/08* (2006.01)
*G06T 7/50* (2017.01)
*G01S 13/89* (2006.01)

(52) U.S. Cl.
CPC .............. *G01S 13/08* (2013.01); *G01S 13/89* (2013.01); *G06T 7/50* (2017.01); *G06T 2207/10044* (2013.01)

(58) Field of Classification Search
CPC ............ G01S 13/08; G01S 13/89; G06T 7/50
See application file for complete search history.

(56) References Cited

U.S. PATENT DOCUMENTS 10,598,783 B2 * 3/2020 Perry .................... G01S 7/4915
2011/0188028 A1 8/2011 Hui et al.
(Continued)

FOREIGN PATENT DOCUMENTS

DE 102018104668 A1 9/2019

OTHER PUBLICATIONS

Agrell, et al., "Closest Point Search in Lattices", In Journal of IEEE Transactions on Information Theory, vol. 48, Issue 8, Aug. 2002, pp. 2201-2214.

(Continued)

*Primary Examiner* — Bryan Bui
(74) *Attorney, Agent, or Firm* — Alleman Hall Creasman & Tuttle LLP

(57) ABSTRACT

Example imaging systems are disclosed. One example includes a signal source and a signal receiver configured to receive a reflected electromagnetic signal from an imaged object. The imaging system further includes a processor configured to, for each of N wavelengths, determine a phase value of a reflected component of the reflected electromagnetic signal having that wavelength. The processor may compute an estimated distance to the imaged object at least in part by mapping the plurality of phase values to a 2N-dimensional vector, and computing a plurality of zeroes of a trigonometric polynomial. For each of the plurality of zeroes, computing the estimated distance may further include computing a respective geodesic distance between the 2N-dimensional vector and a point along the curve evaluated at that zero, and selecting and outputting a shortest geodesic distance multiplied by a least common multiple of the wavelengths.

20 Claims, 10 Drawing Sheets

(56) References Cited

U.S. PATENT DOCUMENTS

2014/0049767 A1 2/2014 Benedetti et al.
2018/0011195 A1 1/2018 Perry et al.
2019/0246032 A1* 8/2019 Bikumandla ........ H04N 5/2226

OTHER PUBLICATIONS

Akhlaq, et al., "Basis Construction for Range Estimation by Phase Unwrapping", In Journal of IEEE Signal Processing Letters, vol. 22, Issue 11, Nov. 2015, pp. 2152-2156.

Akhlaq, et al., "Selecting Wavelengths for Least Squares Range Estimation", In Journal of IEEE Transactions on Signal Processing, vol. 64, Issue 20, Oct. 15, 2016, pp. 5205-5216.

Costantini, et al., "A Fast Phase Unwrapping Algorithm for SAR Interferometry", In Journal of IEEE Transactions on Geoscience and Remote Sensing, vol. 37, Issue 1, Jan. 1999, pp. 452-460.

Foix, et al., "Lock-in Time-of-Flight (ToF) Cameras: A Survey", In Journal of IEEE Sensors, vol. 11, Issue 9, Sep. 2011, pp. 1917-1926.

Hassibi, et al., "Integer Parameter Estimation in Linear Models with Applications to GPS", In Journal of IEEE Transactions on Signal Processing, vol. 46, Issue 11, Nov. 1998, pp. 2938-2952.

Ledeczi, et al., "Node-Density Independent Localization", In Proceedings of the 5th International Conference on Information Processing in Sensor Networks, Apr. 19, 2006, pp. 441-448.

Towers, et al., "Optimum Frequency Selection in Multifrequency Interferometry", In Journal of Optics letters, vol. 28, Issue 11, Jun. 1, 2003, pp. 887-889.

Vaishampayan, et al., "Curves on a Sphere, Shift-Map Dynamics, and Error Control for Continuous Alphabet Sources", In Journal of IEEE Transactions on Information Theory, vol. 49, Issue 7, Jul. 2003, pp. 1658-1672.

Woodward, et al., "A First Course in Differential Geometry: Surfaces in Euclidean Space", In Cambridge University Press, 2019, 274 Pages.

"International Search Report and Written Opinion Issued in PCT Application No. PCT/US21/022024", dated Jun. 28, 2021, 10 Pages.

* cited by examiner

200

Input: The vectors $\mathbf{v} \in \mathbb{Z}^N$ and $\mathbf{y} = [y_1, y_2, \ldots, y_N] = Q[\hat{Y}_1, \hat{Y}_2, \ldots, \hat{Y}_N] \in \mathbb{R}^N$.
Output: The solution $\hat{z}$ to the CVP for $Q$ and $\mathbf{y}$.

<u>Initialization</u>
1: $Q = I - \frac{\mathbf{v}\mathbf{v}^T}{|\mathbf{v}|^2}$
2: $f_{min} = \infty$
3: $\alpha = 1 - \frac{\mathbf{v}^T\mathbf{y}}{|\mathbf{v}|^2}$ <u>Phase 1</u>
4: $i_p \leftarrow 0$
5: for $i = 1 : N$ do
6:   $n_{max} \leftarrow \lfloor y_i - 0.5 + \alpha v_i \rfloor$
7:   for $j = 0 : n_{max}$ do
8:     $x \leftarrow (j + 0.5 - y_i)\frac{|\mathbf{v}|^2}{v_i} + \frac{\mathbf{v}^T\mathbf{y}}{v_i}$
9:     $\Phi[i_p + 1, :] \leftarrow [x, i]$
10:     $i_p \leftarrow i_p + 1$
11:   end for
12: end for

<u>Phase 2</u>
13: $\mathbf{p} \leftarrow \text{sortperm}(\Phi[:,1])$ {sort by x}
14: $\Phi \leftarrow \Phi[\mathbf{p}, :]$
15: $[T_1, T_2, T_3, T_4] \leftarrow [0, 0, 0, 0]$
16: $\mathbf{z} = [z_1, z_2, \ldots, z_N] \leftarrow \mathbf{0}$
17: $S_{vy} \leftarrow \frac{\mathbf{v}^T\mathbf{y}}{|\mathbf{v}|^2}$
18: $i \leftarrow 1$
19: while $i \leq i_p$ do
20:   $j \leftarrow \Phi[i, 2]$
21:   $z_j \leftarrow z_j + 1$
22:   $D \leftarrow \text{true}$
23:   while $D$ do
24:     $T_1 \leftarrow T_1 + 2z_j - 1$
25:     $T_2 \leftarrow T_2 + \frac{v_j}{|\mathbf{v}|}$
26:     $T_3 \leftarrow T_3 + y_j$
27:     $T_4 \leftarrow T_4 + \frac{v_j}{|\mathbf{v}|}$
28:     if $i < i_p$ and $\Phi[i, 1] = \Phi[i+1, 1]$ then
29:       $D \leftarrow \text{true}$
30:       $i \leftarrow i + 1$
31:       $j \leftarrow \Phi[i, 2]$
32:       $z_j \leftarrow z_j + 1$
33:     else
34:       $f_{new} = T_1 - T_2^2 - 2T_3 + 2S_{vy}T_4 + \|\mathbf{y}\|^2$
35:       $D \leftarrow \text{false}$
36:     end if
37:   end while{$D$}
38:   if $f_{new} < f_{min}$ then
39:     $\mathbf{z}^* = \mathbf{z}$
40:     $f_{min} \leftarrow f_{new}$
41:   end if
42:   $i \leftarrow i + 1$
43: end while{$i \leq i_p$}
44: return $\mathbf{z}^*$

FIG. 3

Initialization

1: $Q = I - \frac{vv^T}{\|v\|^2}$
2: $f_{min} = \infty$
3: $\alpha = 1 - \frac{v^T y}{\|v\|^2}$

Phase 1

4: $i_P \leftarrow 0$
5: for $i = 1 : N$ do
6:     $n_{max} \leftarrow \lfloor y_i - 0.5 + \alpha v_i \rfloor$
7:     for $j = 0 : n_{max}$ do
8:         $x \leftarrow (j + 0.5 - y_i)\frac{\|v\|}{v_i} + \frac{v^T y}{\|v\|}$
9:         $\Phi[i_P + 1, :] \leftarrow [x, i]$
10:         $i_P \leftarrow i_P + 1$
11:     end for
12: end for

FIG. 3A

Phase 2
13: $p \leftarrow \text{sortperm}(\Phi[:,1])$ {sort by x}
14: $\Phi \leftarrow \Phi[p,:]$
15: $[T_1, T_2, T_3, T_4] \leftarrow [0,0,0,0]$
16: $z = [z_1, z_2, \ldots, z_N] \leftarrow 0$
17: $S_{vy} \leftarrow \frac{v^T y}{\|v\|}$
18: $i \leftarrow 1$
19: while $i \leq i_p$ do
20:     $j \leftarrow \Phi[i,2]$
21:     $z_j \leftarrow z_j + 1$
22:     $D \leftarrow \text{true}$
23:     while $D$ do
24:       $T_1 \leftarrow T_1 + 2z_j - 1$
25:       $T_2 \leftarrow T_2 + \frac{v_i}{\|v\|}$
26:       $T_3 \leftarrow T_3 + y_j$
27:       $T_4 \leftarrow T_4 + \frac{v_i}{\|v\|}$
28:       if $i < i_p$ and $\Phi[i,1] = \Phi[i+1,1]$ then
29:         $D \leftarrow \text{true}$
30:         $i \leftarrow i + 1$
31:         $j \leftarrow \Phi[i,2]$
32:         $z_j \leftarrow z_j + 1$
33:       else
34:         $f_{new} = T_1 - T_2^2 - 2T_3 + 2S_{vy}T_4 + \|y\|^2$
35:         $D \leftarrow \text{false}$
36:       end if
37:     end while{D}
38:     if $f_{new} < f_{min}$ then
39:       $z^* = z$
40:       $f_{min} \leftarrow f_{new}$
41:     end if
42:     $i \leftarrow i + 1$
43: end while{$i \leq i_p$}
44: return $z^*$

FIG. 3B

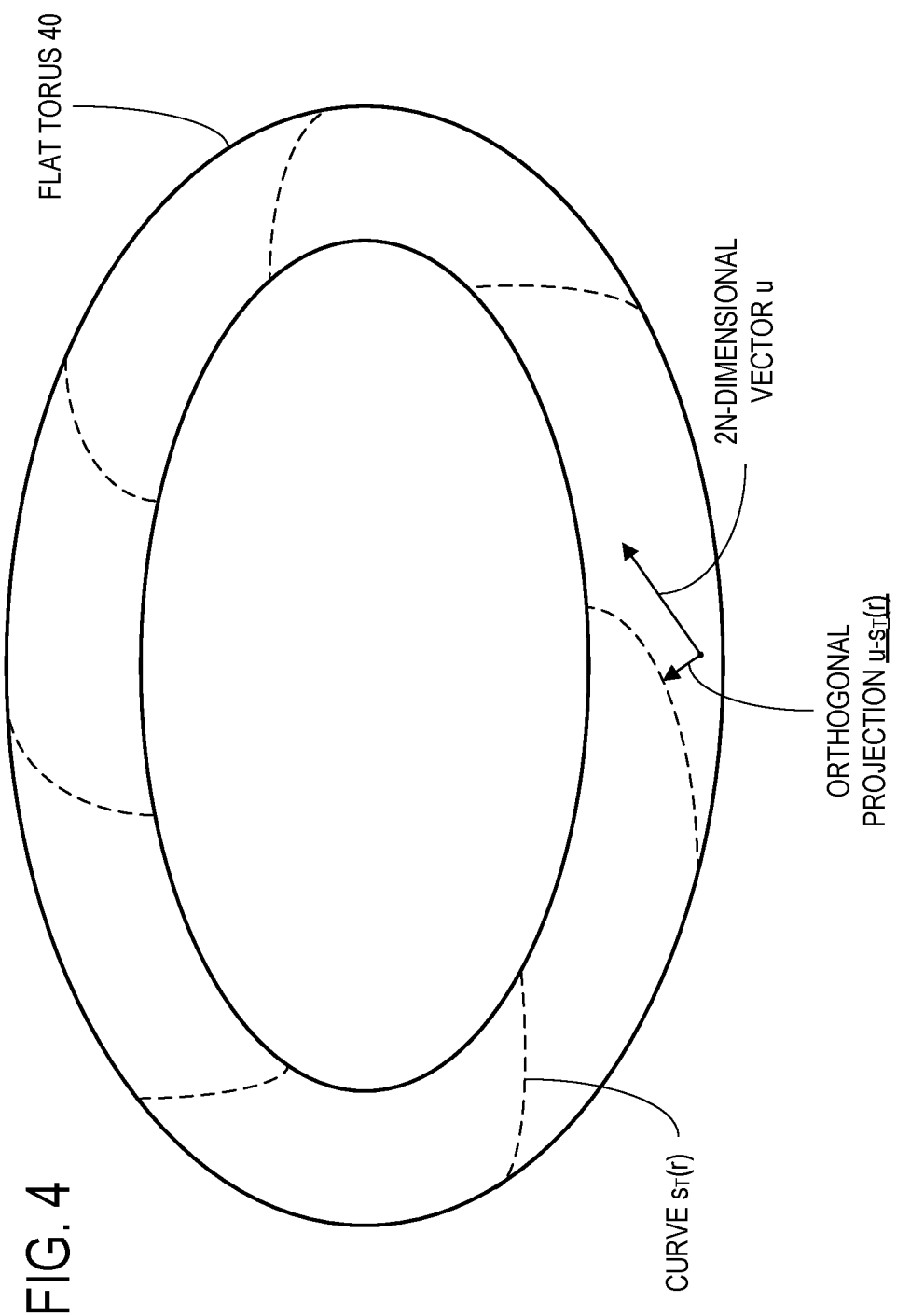

PHASE UNWRAPPING WITH MULTIPLE WAVELENGTHS ON A FLAT TORUS

CROSS REFERENCE TO RELATED APPLICATIONS

This application claims priority to U.S. Provisional Patent Application Ser. No. 63/025,885, filed May 15, 2020, the entirety of which is hereby incorporated herein by reference for all purposes.

BACKGROUND

The estimation of distance is a problem encountered in many applications such as Synthetic Aperture Radar (SAR) Imaging, Optical Interferometry, Radio Interferometric Positioning System (RIPS), and Time-of-Flight Imaging, among others. Each of these techniques uses a signal source, which emits one or multiple signals of different wavelengths, and a receiver. After hitting a target in the environment, the energy carried by these signals is scattered back toward the receiver.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of the present disclosure, an imaging system is provided, including a signal source configured to emit an electromagnetic signal. The imaging system may further include a signal receiver configured to receive a reflected electromagnetic signal from an imaged object in a physical environment. The imaging system may further include a processor configured to, for each of a plurality of N wavelengths, determine a phase value of a reflected component of the reflected electromagnetic signal having that wavelength. The processor may be further configured to, from the plurality of phase values, compute an estimated distance between the imaged object and the receiver. Computing the estimated distance may include mapping the plurality of phase values to a 2N-dimensional vector. Computing the estimated distance may further include computing a plurality of zeroes of a trigonometric polynomial. The trigonometric polynomial may be an orthogonal projection of the 2N-dimensional vector onto a curve along a flat torus. For each of the plurality of zeroes, computing the estimated distance may further include computing a respective geodesic distance between the 2N-dimensional vector and a point along the curve evaluated at that zero. Computing the estimated distance may further include selecting and outputting, as the estimated distance, a shortest geodesic distance of the plurality of geodesic distances multiplied by a least common multiple of the wavelengths.

BRIEF DESCRIPTION OF THE DRAWINGS

FIGS. 3A-3B shows an IP1 sphere decoder algorithm, according to the example of FIG. 1.

FIG. 4 shows a projection of a six-dimensional flat torus onto a three-dimensional torus, according to the example of FIG. 1.

DETAILED DESCRIPTION

As discussed above, when an optical, radio, or other electromagnetic signal is emitted by a signal source included in an imaging system, the signal may scatter off objects in the environment and impinge upon a receiver included in the imaging system. The waveform of the received signal may then be decoded and the delay between the phase of the transmitted and the received signals may be estimated. Based on the wavelength of the signal and the phase delay of the received signal, the distance to the imaged object may be estimated. However, when the distance to the imaged object is greater than the wavelength, phase wrapping occurs, in which multiple estimated distance values separated by multiples of the wavelength result in the received signal having the same phase delay.

In order to allow the correct distance to the imaged object to be identified, multiple components with different wavelengths may be included in the electromagnetic signal. The receiver may receive these components with different phase delays after the components are scattered by the imaged object. A phase unwrapping algorithm may then be used to estimate the distance to the imaged object based on the phase delays of the components of the reflected signal.

The measurements of the phase delays for the components of the reflected signal each include noise due to measurement error. Existing methods of phase unwrapping may require low levels of noise in order to return accurate estimates of the distance to the imaged object. Accordingly, imaging systems that employ existing methods of phase unwrapping may have to use signals with higher power than would be desirable in order to achieve signal-to-noise ratios high enough to achieve low levels of error.

Figure 1:
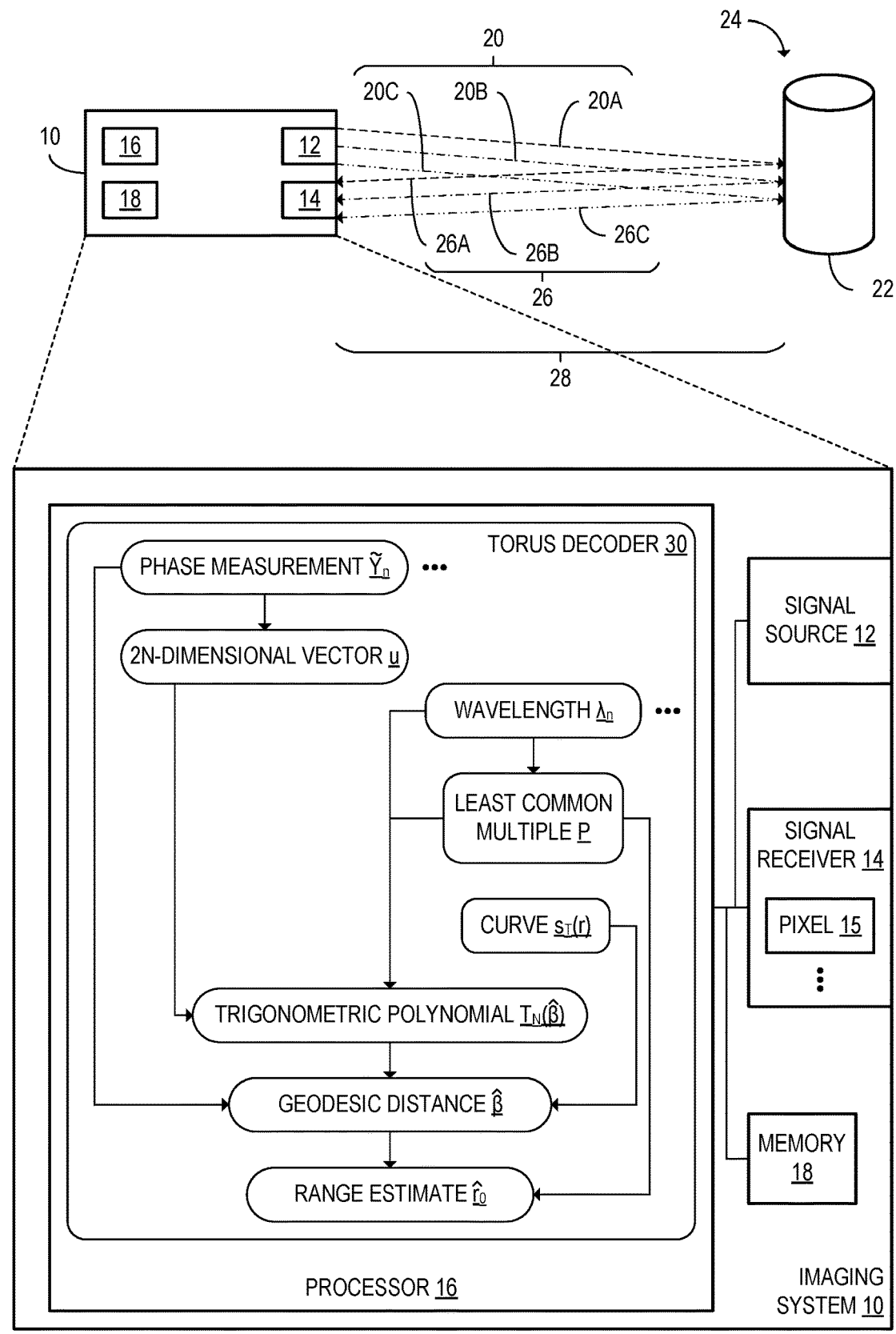
FIG. 1 shows an example imaging system, according to one example of the present disclosure.

In order to address the above problem, the systems and methods discussed below are provided. FIG. 1 shows an example imaging system 10, according to one example. The imaging system 10 may include a signal source 12 configured to emit an electromagnetic signal 20. The electromagnetic signal 20 may be a radio signal, an infrared signal, a visible light signal, or an ultraviolet signal. The electromagnetic signal 20 may include a plurality of emitted components. In the example of FIG. 1, the electromagnetic signal 20 includes a first emitted component 20A, a second emitted component 20B, and a third emitted component 20C, each of which has a different respective wavelength. Although the example of FIG. 1 shows three components, some other number of components may be used. For example, the number of emitted components may be between three and nine. In some examples, the emitted components of the electromagnetic signal 20 may be emitted during separate periods of time. Alternatively, the signal source 12 may be configured to emit two or more of the emitted components concurrently.

The electromagnetic signal 20 may reflect off an imaged object 22 in a physical environment 24 and return to the imaging system 10. The imaging system 10 may further include a signal receiver 14 configured to receive a reflected electromagnetic signal 26 from the imaged object 22. The imaged object 22 may be a distance 28 from the signal receiver 14. The reflected electromagnetic signal 26 may include a reflected component for each emitted component of the electromagnetic signal 20. The example of FIG. 1 shows the reflected electromagnetic signal 26 as having a first reflected component 26A, a second reflected component 26B, and a third reflected component 26C corresponding to the first emitted component 20A, the second emitted component 20B, and the third emitted component 20C of the electromagnetic signal 20 output by the signal source 12. In some examples, the signal receiver 14 may include a plurality of pixels 15.

The imaging system 10 may further include a processor 16 and memory 18. Although the processor 16 and the memory 18 are shown in FIG. 1 as being located in the same physical device as the signal source 12 and the signal receiver 14, the processor 16 and the memory 18 may alternatively be provided in a separate physical device configured to communicate with the signal source 12 and the signal receiver 14. Additionally or alternatively, some or all of the processes executed by the processor 16 and the memory 18 may be distributed across a plurality of communicatively coupled computing devices.

The processor 16 may be configured to perform phase unwrapping and estimate the distance 28 between the imaged object 22 and the signal receiver 14 according to the following approach. When the processor 16 performs phase unwrapping, the processor 16 may be configured to, for each of the plurality of wavelengths, determine a phase value of a reflected component of the reflected electromagnetic signal 26 having that wavelength. The phase values may, for example, be determined based on the amplitudes of the reflected components. The processor 16 may be further configured to execute a torus decoder 30, which may receive wavelength data for the electromagnetic signal 20 and phase data for the reflected electromagnetic signal 26 as inputs and may output a range estimate of the distance 28. In examples in which the signal receiver 14 includes a plurality of pixels 15, the processor 16 may be configured to compute the estimated distance 28 for each pixel 15 of the plurality of pixels 15 included in the signal receiver 14.

A plurality of N phase measurements $\tilde{Y}_n$ for n=1, ..., N may be expressed by the following equation:

$$\tilde{Y}_n = \left\langle \frac{r_0}{\lambda_n} + \tilde{\Phi} \right\rangle$$

where $r_0$ is the unknown target distance, $\lambda_n \in \mathbb{N}$ is the wavelength of the signal, $\tilde{\Phi}$ is additive random measurement noise, and $\langle x \rangle = x - \lfloor x + \frac{1}{2} \rfloor$, where $\lfloor x \rfloor$ is the floor operator. A quantity affected by random noise is denoted by $\tilde{x}$.

The following least-squares cost function may be used:

$$LS(r) = \sum_{n=1}^{N} \left\langle \tilde{Y}_n - \frac{r}{\lambda_n} \right\rangle^2$$

In addition, the following least-squares estimator may be used:

$$\hat{r}_0 = \arg\min_{r} LS(r)$$

Thus, $\hat{r}_0$ is the estimate of the target distance $r_0$ that has the lowest error as computed with the least-squares cost function shown above.

The notation for the unknown target distance $r_0$ may be changed to $r_0 = P\beta$. In this notation, $P = LCM(\lambda_1, \lambda_2, \ldots \lambda_N)$, where LCM is the least common multiple function. In addition, $\beta$ is a normalized distance, where $0 \leq \beta \leq 1$. A latent variable $v_n$ may be further defined as follows:

$$v_n = P/\lambda_n \in \mathbb{Z}.$$

With the notation introduced above, the least-squares estimator may be expressed as $$\hat{r}_0 = P\hat{\beta}$$

where $$\hat{\beta} = \arg\min_{\beta} F(\beta) = \arg\min_{\beta} \sum_{n=1}^{N} \left\langle \tilde{Y}_n - \beta v_n \right\rangle^2$$

The $\langle x \rangle$ operator may then be eliminated by introducing the latent variables $z_n \in \mathbb{Z}$ to express the function F as follows:

$$F(\beta) = \arg\min_{z_1,\ldots,z_N \in \mathbb{Z}} \sum_{n=1}^{N} \left( \tilde{Y}_n - \beta v_n - z_n \right)^2$$

Thus, recovery of the target distance $r_0$ may be expressed as an Integer Least Squares (ILS) problem.

The ILS problem discussed above may be solved by solving the Closed Vector Point (CVP) problem for a lattice. When solving the CVP problem, the following vectors may be defined:

$$\tilde{y} = [\tilde{Y}_1, \ldots, \tilde{Y}_N] \in \mathbb{R}^N$$

$$z = [z_1, \ldots, z_N] \in \mathbb{Z}^N$$

and $$v = [v_1, \ldots, v_N] = \left[ \frac{P}{\lambda_1}, \ldots, \frac{P}{\lambda_N} \right] \in \mathbb{Z}^N$$

The problem of estimating $\beta$ may then be decoupled from the problem of estimating z by first solving the following optimization problem:

$$\hat{z} = \arg\min_{z \in \mathbb{Z}^N} \|Q\tilde{y} - Qz\|^2$$

where Q is an orthogonal projection matrix onto the (N−1)-dimensional subspace orthogonal to v, given by:

$$Q = I - \frac{v\, v^T}{\|v\|^2}$$

In which I is an N×N identity matrix. The normalized distance $\hat{\beta}$ may then be estimated via linear regression as follows:

$$\hat{\beta}(\hat{z}) = \frac{(\tilde{y} - \hat{z})^T v}{v^T v}$$

Solving for $\hat{z}$ is equivalent to solving for the Closest Vector Point (CVP) of the lattice $\Lambda = \{Qz; z \in \mathbb{Z}^N\}$ to $Q\tilde{y}$. This CVP problem may be solved using a sphere decoding algorithm. Since the matrix Q has a rank N−1, the lattice $\Lambda$ is not full-dimensional in $\mathbb{R}^N$. Thus, a new basis may be computed for the lattice $\Lambda$. The range may then be estimated as the following:

$$\hat{r}_0 = P(\hat{\beta}(\hat{z}) - \lfloor \hat{\beta}(\hat{z}) \rfloor)$$

Thus, the radial distance estimation may include a first phase in which the wrapping variables $z_n$ are estimated and a second phase in which the linear regression is performed.

Figure 2:
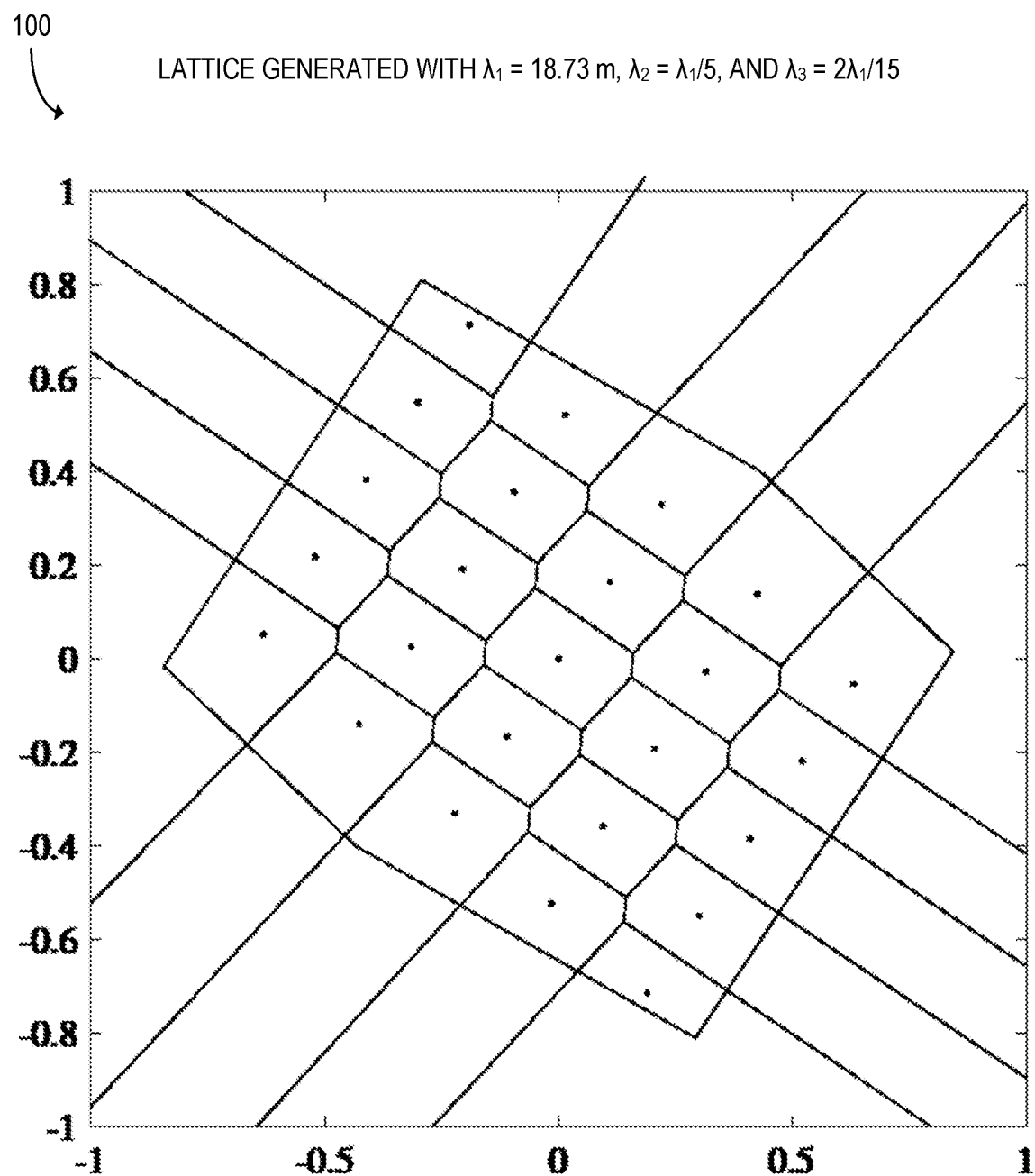
FIG. 2 shows a plot of an example lattice, according to the example of FIG. 1.

FIG. 2 shows a plot of an example lattice 100, according to the example of FIG. 1. In the example lattice 100 of FIG. 2, the first component 26A of the reflected electromagnetic signal 26 has a wavelength $\lambda_1 = 18.73$ m, the second component 26B has a wavelength $\lambda_2 = \frac{1}{5}\lambda_1$, and the third component 26C has a wavelength $\lambda_3 = \frac{2}{15}\lambda_1$. The least common multiple P of these wavelengths is 37.46 m. The lattice 100 is centered at the origin, and the plane on which the lattice 100 is depicted is orthogonal to v. The axes are the components of the 2×1 vector w given by the equation $$w = Q_b Q \tilde{y}$$

where $Q_b$ is a 2×3 matrix obtained by performing QR decomposition on v.

In the example lattice 100 of FIG. 2, the large convex polygon is the projection, onto the plane orthogonal to v, of a cube centered at the origin within which the elements of $\hat{y}$ are located. The cells located within the large convex polygon in FIG. 2 are Voronoi cells, each of which corresponds to a different value of the 3×1 vector of integer values z. When the processor 16 solves the closest vector point problem, the processor 16 may determine the value of z corresponding to the Voronoi cell in which $Q\tilde{y}$ is located.

A first source of error in the estimation of $\hat{r}_0$ may be error in the estimation of the wrapping variables $z_n$. These errors in the estimation of $z_n$ are referred to as phase unwrapping errors. The phase unwrapping errors may be responsible for the onset of a threshold effect observed in the Mean Square Error (MSE) vs. signal-to-noise ratio (SNR) curve for the range estimation.

When estimating the remaining sources of error, the measurements of $\hat{Y}_n$ may be assumed to be independent and normally distributed with variance $\sigma^2$. In addition, the wrapping variables $z_n$ may be assumed to have been estimated accurately. The remaining error in $\hat{r}_0$ is linear regression error given by the following equation:

$$\text{var}\{\hat{r}_0\} = \frac{\sigma^2}{\sum_{n=1}^{N} \lambda_n^{-2}}$$

The wavelengths of the components of the electromagnetic signal 20 may be selected as follows. The following parameterization in terms of a base wavelength $\lambda_B$ and parameterization variables $p_n, q_n \in \mathbb{N}$ may be used for the wavelengths:

$$\lambda = \left[\lambda_B, \lambda_B \frac{p_2}{q_2}, \ldots, \lambda_B \frac{p_N}{q_N}\right]$$

With this parameterization, v may be rewritten as:

$$v = LCM(p_2, \ldots, p_N)\left[1, \frac{q_2}{p_2}, \ldots, \frac{q_N}{p_N}\right]$$

In addition, $$\|v\|^2 = LCM(p_2, \ldots, p_N)^2 \left(1 + \sum_{n=2}^{N} \frac{q_n^2}{p_n^2}\right)$$

An upper bound on the probability of an unwrapping error may be given by:

$$p(correct unwrapping) \leq F_{N-1}\left(\frac{\Gamma\left(\frac{N}{2} + \frac{1}{2}\right)^{\frac{2}{N-1}}}{\|v\|^{\frac{2}{N-1}} \sigma^2 \pi}\right)$$

where $\Gamma(\cdot)$ is the Gamma function and $F_N(\cdot)$ the $\chi^2$ cumulative distribution function with N degrees of freedom.

The probability of an unwrapping error may be minimized by selecting wavelengths with $q_n = 1$ and $p_n$, $n = 2, \ldots, N$ that have the lowest LCM. The following table shows such values of p for $N = 3, \ldots, 9$:

| N | p | LCM |
|---|---|---|
| 3 | 1, 2, 4 | 4 |
| 4 | 1, 2, 3, 6 | 6 |
| 5 | 1, 3, 4, 6, 12 | 12 |
| 6 | 1, 2, 3, 4, 6, 12 | 12 |
| 7 | 1, 3, 4, 6, 8, 12, 24 | 24 |
| 8 | 1, 2, 3, 4, 6, 8, 12, 24 | 24 |
| 9 | 1, 2, 3, 4, 5, 15, 20, 30, 60 | 60 |

Thus, when the signal source 12 emits the electromagnetic signal 20, the plurality of N wavelengths of the emitted components may be selected such that a ratio of the least common multiple P to a lowest wavelength $\lambda_{min}$ of the plurality of N wavelengths is minimized. By using one of the above values of p, a user may avoid having to compute the emitted wavelengths as the solution to a cost function.

In some examples, the processor 16 may be configured to execute a sphere decoding algorithm to solve for $\hat{z}$. An example of an IP1 sphere decoding algorithm 200 is shown in FIGS. 3A-3B. The IP1 sphere decoding algorithm 200 may be used when the matrix Q is a rank deficient symmetric positive semidefinite (PSD) matrix. With the IP1 sphere decoding algorithm 200, $\hat{z}$ may be computed with a lower computational complexity than that of existing sphere decoding algorithms. The IP1 sphere decoding algorithm 200 shown in FIGS. 3A-3B has polynomial complexity. As shown in FIGS. 3A-3B, the IP1 sphere decoding algorithm 200 may receive $v \in \mathbb{Z}^N$ and $y=[y_1, y_2, \ldots, y_N]=Q[\tilde{Y}_1, \tilde{Y}_2, \ldots, \tilde{Y}_N] \in \mathbb{R}^N$ as inputs and may output the solution $\hat{z}$ to the CVP problem for y and Q.

During the Initialization phase of the IP1 sphere decoding algorithm 200, as shown in FIG. 3A, the matrix Q may be defined. In addition, the processor 16 may be configured to set an initial value of a cost function $f_{min}$ to infinity (or other suitably high value) and to define a scalar value α based on y and v. During Phase 1 of the IP1 sphere decoding algorithm 200, as shown in FIG. 3A, the processor 16 may be further configured to set the elements of a matrix Φ, which are sorted at the beginning of Phase 2.

During Phase 2 of the IP1 sphere decoding algorithm 200, as shown in FIG. 3B, the processor 16 is configured to compute a plurality of estimated elements $z_j$ of the closest vector point $\hat{z}$ over a plurality of iterations. In addition, the processor 16 may be configured to compute a value of the cost function $f_{min}$ during each of the plurality of iterations. The processor 16 may be further configured to estimate a minimum value of the cost function $f_{min}$ as a function of the values of the estimated elements estimated elements $z_j$ of the closest vector point $\hat{z}$.

Subsequently to computing the solution to the CVP, the processor 16 may be further configured to compute the normalized distance $\hat{\beta}(\hat{z})$ based on the plurality of phase values $\tilde{y}$, the closest vector point $\hat{z}$, and the vector v by computing a linear regression of $\tilde{y}-\hat{z}$ onto v, as discussed above. The processor 16 may be further configured to compute the estimated distance $\hat{r}_0$ based on the normalized distance $\hat{\beta}(\hat{z})$ and the least common multiple P as shown above using the equation $\hat{r}_0 = P(\hat{\beta}(\hat{z}) - \lfloor \hat{\beta}(\hat{z}) \rfloor)$.

The computations that may be performed at the processor 16 when executing the torus decoder 30 are now discussed. Solving for $\hat{\beta}$ using the torus decoder 30 may provide for a lower signal-to-noise ratio than using the IP1 algorithm above, but also may be less computationally efficient.

Noisy phase data measured for waveforms with multiple respective wavelengths may be unwrapped using methods for decoding an analog signal on a flat torus. Let a curve be defined by the following equation:

$$s_T(r) = \left[\cos\left(2\pi\frac{r}{\lambda_1}\right), \sin\left(2\pi\frac{r}{\lambda_1}\right), \ldots, \cos\left(2\pi\frac{r}{\lambda_N}\right), \sin\left(2\pi\frac{r}{\lambda_N}\right)\right]$$

for $r \in [0, P]$. This curve lies on an N-dimensional surface in $\mathbb{R}^{2N}$ known as the flat torus. In addition, a 2N-dimensional vector $u = [u_1, u_2, \ldots, u_{2N}]$ may be defined to have the following properties:

$$u_{2i-1} = \cos(2\pi\tilde{Y}_i)$$

$$u_{2i} = \sin(2\pi\tilde{Y}_i)$$

$$i = 1, \ldots, N$$

FIG. 4 shows an example projection of a six-dimensional flat torus 40 onto a three-dimensional torus. Three-dimensional representations of the curve $s_T(r)$ and the 2N-dimensional vector u are also shown in FIG. 4, although the curve $s_T(r)$ and the 2N-dimensional vector u are six-dimensional objects.

With the flat torus and the vector u defined as shown above, the maximum-likelihood estimator $\hat{r}$ may be given by the estimator:

$$\hat{r} = \arg\min_r \|u - s_T(r)\|^2$$

The solution to the above equation is the orthogonal projection of u onto $s_T$:

$$(u - s_T(r)) \cdot \dot{s}_T(r)|_{r=\hat{r}} = 0$$

where $\dot{s}_T(r)$ is the derivative of $s_T(r)$ with respect to r. FIG. 4 further shows a three-dimensional representation of the orthogonal projection $u - s_T(r)$ of the 2N-dimensional vector u onto the curve $s_T(r)$.

The orthogonal projection may be determined by solving for the zeroes of the following trigonometric polynomial in $\hat{\beta}$:

$$T_N(\hat{\beta}) = \sum_{i=1}^{N} v_i \sin(2(v_i\hat{\beta} - \tilde{Y}_i)) = 0$$

Solving for the zeroes of the trigonometric polynomial $T_N(\hat{\beta})$ may include forming the following 2M×2M complex companion matrix (CCM):

$$B_{jk} = \begin{cases} \delta_{j,k-1}, & j = 1, \ldots, 2M-1 \\ \dfrac{-h_{k-1}}{a_M - ib_M}, & j = 2M \end{cases}$$

where $$h_j = \begin{cases} a_{M-j} + ib_{M-j}, & j = 0, \ldots, M-1 \\ 2a_0, & j = M \\ a_{j-M} - ib_{j-M}, & j = M+1, \ldots, 2M \end{cases}$$

and a, b, and M are defined as follows:

$$v'_0 = 0$$

$$v'_j = j1_v(j)$$

$$a_j = -v'_j \sin(2\pi\tilde{Y}_j)$$

$$b_j = v'_j \cos(2\pi\tilde{Y}_j)$$

$$M = \max_{1 \le n \le N} v_n$$

In the above definitions, $1_v(j)$ denotes the indicator function of v. With these definitions, $h_0 = 0$. In addition, M is a ratio of the least common multiple P to a lowest wavelength $\lambda_{min}$ of the plurality of N wavelengths.

Complex eigenvalues $z_j$ of B may then be computed. The zeroes of the trigonometric polynomial $T_N(\hat{\beta})$ are then given by:

$$\hat{\beta}_j = \angle z_j$$

for $j = 0, \ldots, 2M$, where $\angle$ denotes the argument function.

Instead of using a generic eigensolver to compute the eigenvalues of B, Durand-Kerner iterations may be used.

Each of the eigenvalues $z_j$ has a magnitude $\|z_j\|=1$. Thus, the eigenvalues may be iteratively computed as follows:

$$z_j^{(r+1)} = z_j^{(r)} - \frac{h(z_j^{(r)})}{\prod_{\substack{k=1 \\ k \neq j}}^{2M}(z_j^{(r)} - z_k^{(r)})}$$

for j=0, ..., 2M. As starting values, the following 2M+1 equally spaced points on the unit circle may be used:

$$z_j^{(0)} = e^{i\left(\frac{2\pi}{2M+1}j+\alpha\right)}$$

where $$\alpha = \frac{\pi}{2(2M+1)}$$

This technique may allow the eigenvalues of B to be computed more quickly compared to conventional eigenvalue computing methods.

In the above solution to the trigonometric polynomial $T_N(\hat{\beta})$, the different zeroes of $T_N(\hat{\beta})$ correspond to different folds of $s_T(r)$ as it unwinds on the flat torus. To choose the correct zero, the geodesic distance may be computed between u and $s_T(P\hat{\beta}_j)$ for j=0, ..., 2M using the following flat torus isometric embedding:

$$\hat{\beta} = \arg \min_{0 \leq j \leq 2M} \sum_{n=1}^{N} \sin^2\left(\pi(v_n\hat{\beta}_j - \tilde{Y}_n)\right)$$

The final range estimate $\hat{r}_0=P\hat{\beta}$ may then be computed. This final range estimate $\hat{r}_0$ may be considered the result of geodesic regression on a Riemannian manifold.

Figure 5:
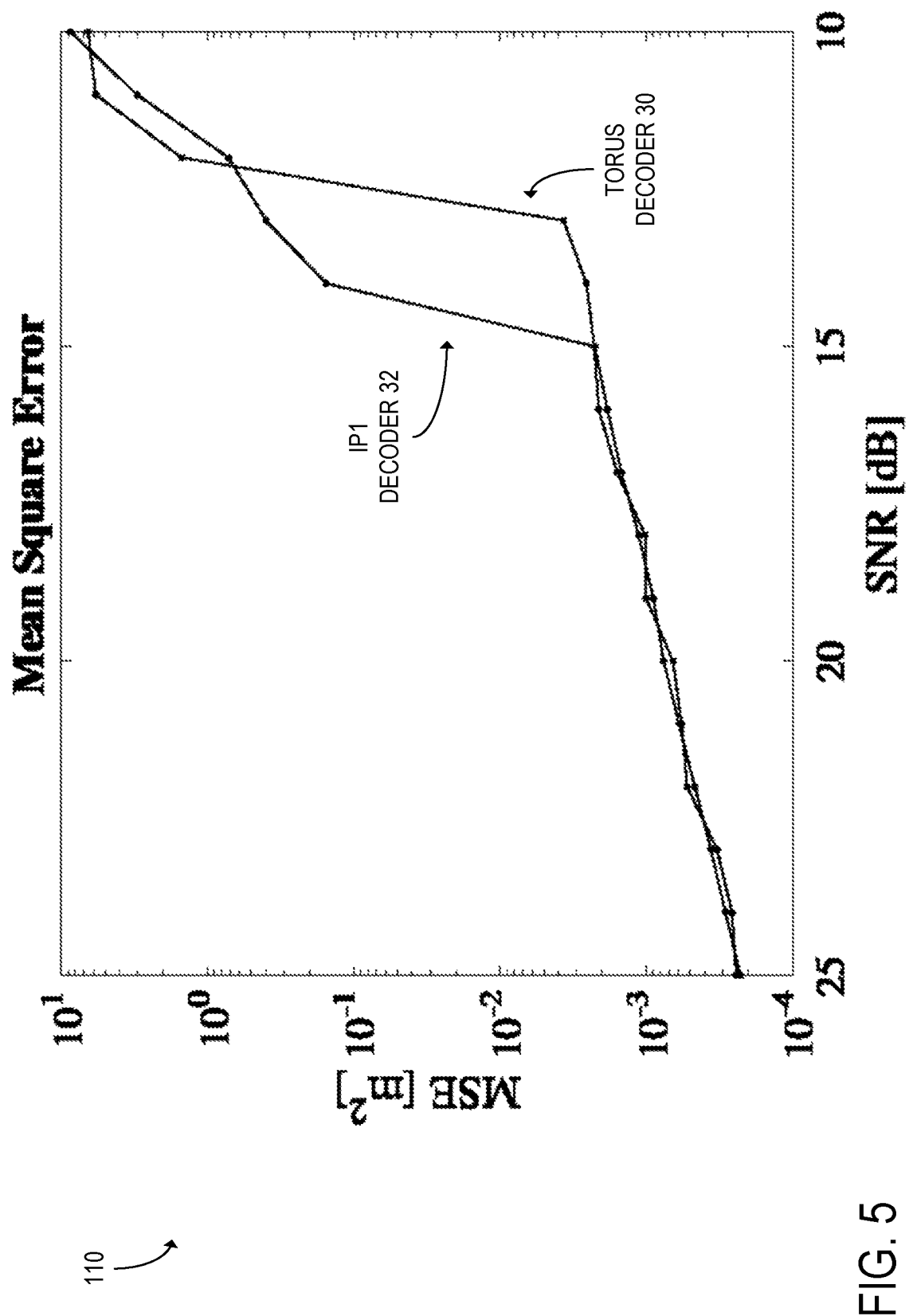
FIG. 5 shows an example plot of mean squared error as a function of signal-to-noise ratio for a conventional decoder and a torus decoder, according to the example of FIG. 1.

Using the above method of computing the range estimate, the mean squared error (MSE) of the range estimate may be reduced. When the torus decoder is used, the critical signal-to-noise ratio (SNR) at which a rapid increase in the MSE occurs may be higher than the critical SNR for a conventional decoder. FIG. 5 shows a plot 110 of MSE as a function of SNR for both an IP1 decoder 32 and the torus decoder 30. The IP1 decoder 32 has a sharp increase in the MSE of the estimated range at an SNR of approximately 15 dB. In contrast, the range estimate made using the torus decoder 30 does not undergo a sharp increase until an SNR of approximately 13 dB. Thus, range estimates made using the torus decoder 30 may remain accurate at higher levels of noise compared to range estimates made using conventional unwrapping techniques. As a result of this increase in robustness to noise, distance measurements may be made using lower-powered electromagnetic signals 20 compared to the electromagnetic signals that would be used with the IP1 decoder 32.

Figure 6A:
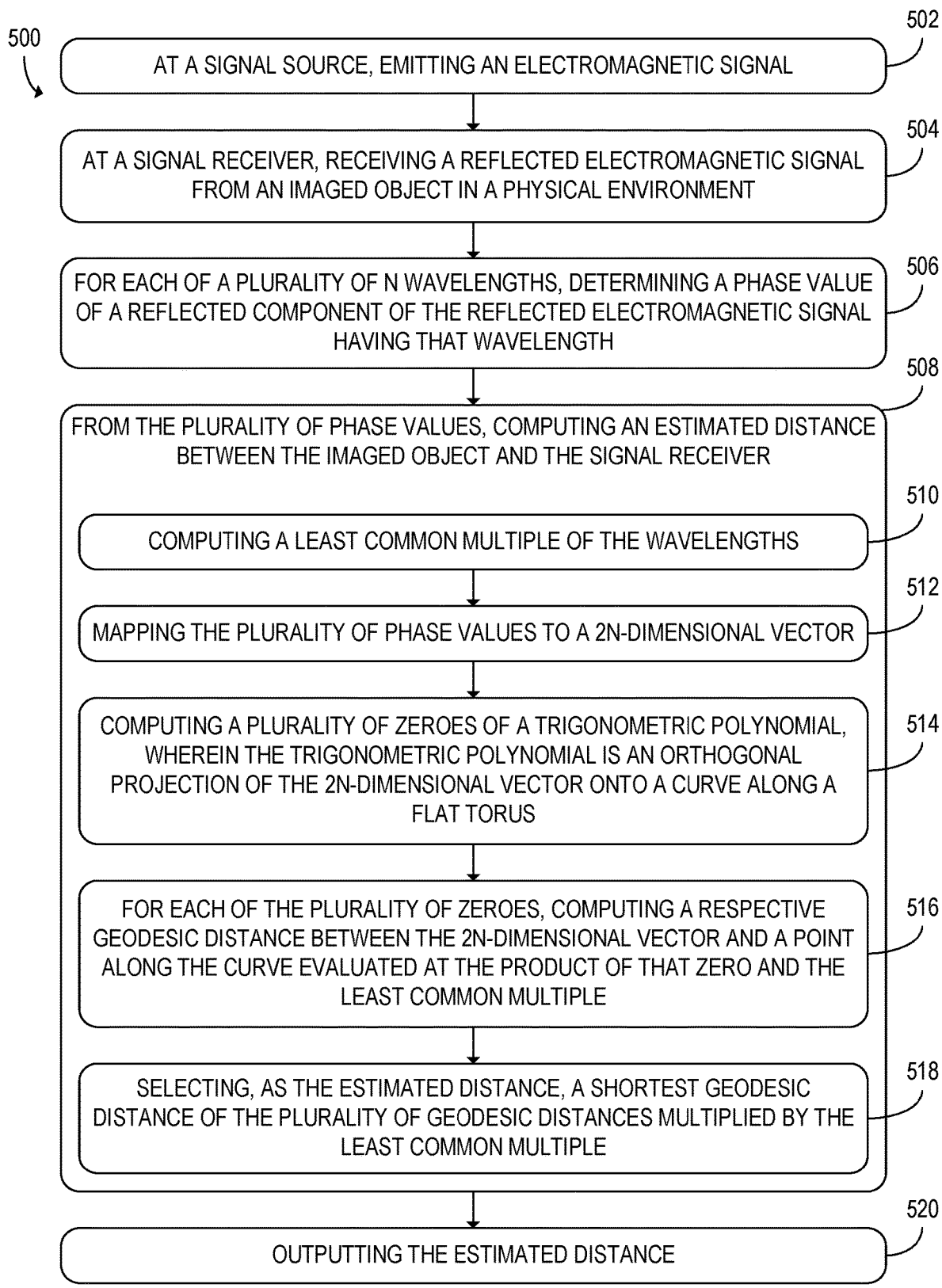
FIGS. 6A and 6B show a flowchart of an example method that may be used with an imaging system, according to the example of FIG. 1.

FIG. 6A shows a flowchart of an example method 500 that may be performed at an imaging system. The method 500 may be performed at the imaging system 10 shown in FIG. 1, or alternatively at some other imaging system. At step 502, the method 500 may include, at a signal source, emitting an electromagnetic signal. The electromagnetic signal may include a plurality of emitted components having a plurality of N different wavelengths. In some examples, the plurality of N wavelengths of the emitted components may be selected such that a ratio of the least common multiple of the plurality of N wavelengths to a lowest wavelength of the plurality of N wavelengths is minimized. At step 504, the method 500 may further include, at a signal receiver, receiving a reflected electromagnetic signal from an imaged object in a physical environment. The reflected electromagnetic signal may include a plurality of reflected components having substantially equal wavelengths to the wavelengths of the plurality of emitted components.

The following steps of the method 500 may be performed at a processor of the imaging system. At step 506, the method 500 may further include, for each of the plurality of N wavelengths, determining a phase value of a reflected component of the reflected electromagnetic signal having that wavelength. From the plurality of phase values, the method 500 may further include, at step 508, computing an estimated distance between the imaged object and the signal receiver. In examples in which the signal receiver includes a plurality of pixels, the estimated distance may be computed for each pixel of the plurality of pixels included in the signal receiver. Step 508 may be performed at a torus decoder executed by the processor included in the imaging system.

At step 510, step 508 may include computing a least common multiple of the wavelengths. At step 512, step 508 may further include mapping the plurality of phase values to a 2N-dimensional vector. The 2N-dimensional vector may be the 2N-dimensional vector u discussed above, which includes, for each phase value $\tilde{Y}_i$ of the plurality of phase values, a first element equal to $\cos(2\pi\tilde{Y}_i)$ and a second element equal to $\sin(2\pi\tilde{Y}_i)$. At step 514, step 508 may further include computing a plurality of zeroes of a trigonometric polynomial. The trigonometric polynomial may be the trigonometric polynomial $T_N(\hat{\beta})$ discussed above and may be an orthogonal projection of the 2N-dimensional vector onto a curve along a flat torus. The curve along the flat torus may be the curve $s_T(r)$ discussed above.

Figure 6B:
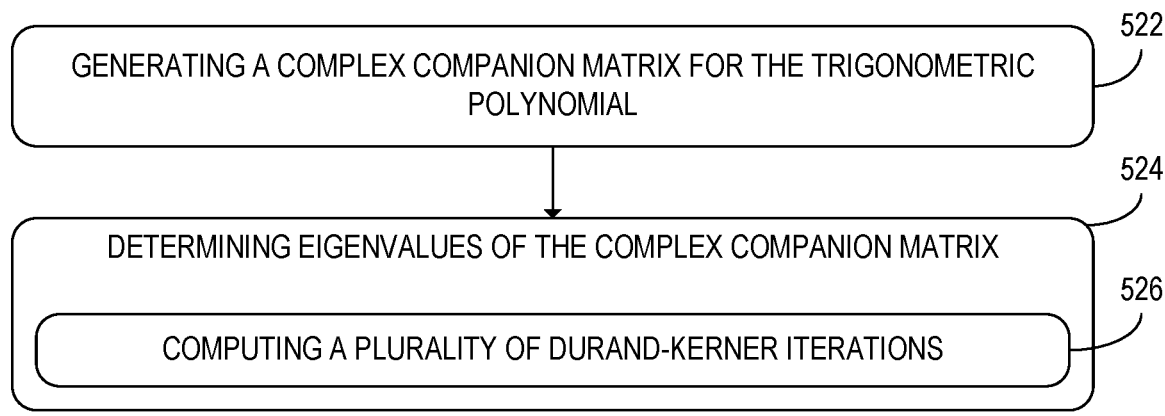

In some examples, step 514 may include the steps shown in FIG. 6B. At step 522, step 514 may include generating a complex companion matrix for the trigonometric polynomial. The complex companion matrix may be the complex companion matrix $B_{jk}$ discussed above. In such examples, step 514 may further include, at step 524, determining eigenvalues of the complex companion matrix. The complex companion matrix may have dimensions 2M×2M, wherein M is a ratio of the least common multiple to a lowest wavelength of the plurality of N wavelengths. Determining the eigenvalues of the complex companion matrix may include, at step 526, computing a plurality of Durand-Kerner iterations. The zeroes of the trigonometric polynomial may be equal to the arguments of the eigenvalues computed at step 518.

Step 508 may further include, at step 516, for each of the plurality of zeroes, computing a respective geodesic distance between the 2N-dimensional vector and a point along the curve evaluated at the product of that zero and the least common multiple. These geodesic distances may be distances between the 2N-dimensional vector u and $s_T(P\hat{\beta}_j)$, where P is the least common multiple and $\hat{\beta}_j$ is the j-th zero of the trigonometric polynomial. Step 508 may further include, at step 518, selecting, as the estimated distance, a shortest geodesic distance of the plurality of geodesic distances multiplied by the least common multiple. Thus, the imaging system may generate an estimate of the distance between the imaged object and the signal receiver. At step 520, the method 500 may further include outputting the estimated distance.

In some examples, the methods and processes described herein may be tied to a computing system of one or more computing devices. In particular, such methods and processes may be implemented as a computer-application program or service, an application-programming interface (API), a library, and/or other computer-program product.

Figure 7:
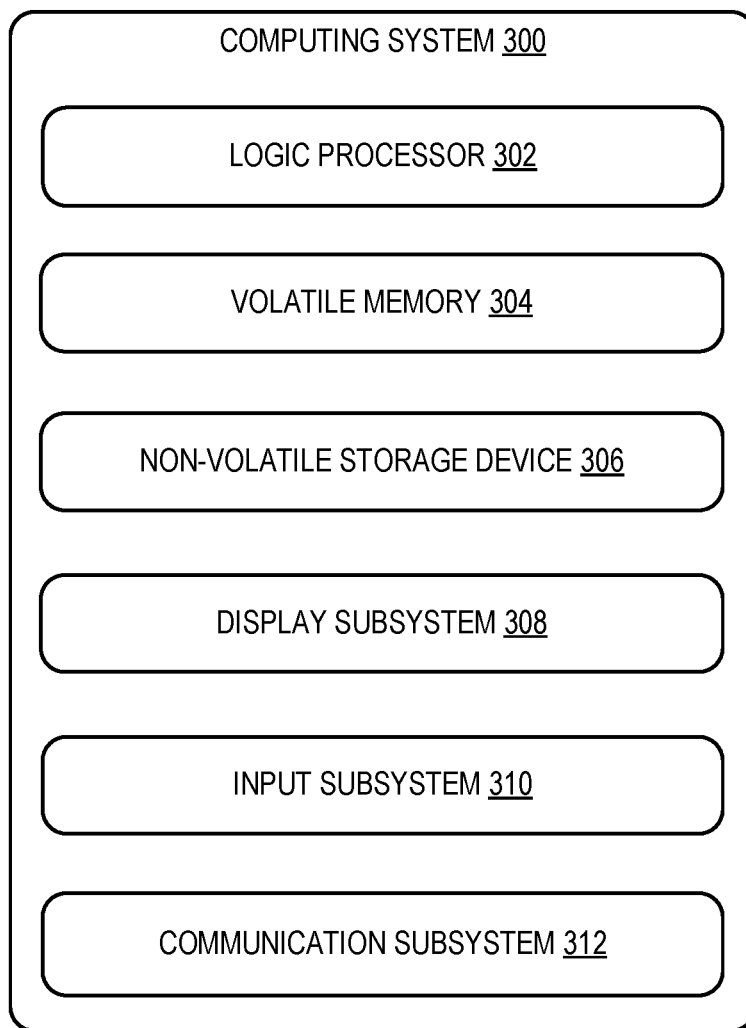
FIG. 7 schematically shows a non-limiting example of a computing system, according to the example of FIG. 1.

FIG. 7 schematically shows a non-limiting example of a computing system 300 that can enact one or more of the methods and processes described above. Computing system 300 is shown in simplified form. Computing system 300 may embody the imaging system 10 described above and illustrated in FIG. 1. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 7.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some examples, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network. In some examples, the communication subsystem may allow computing system 300 to send and/or receive messages to and/or from other devices via a network such as the Internet.

Another example provides an imaging system, including a signal source configured to emit an electromagnetic signal. The imaging system may further include a signal receiver configured to receive a reflected electromagnetic signal from an imaged object in a physical environment. The imaging system may further include a processor configured to, for each of a plurality of N wavelengths, determine a phase value of a reflected component of the reflected electromagnetic signal having that wavelength. The processor may be further configured to, from the plurality of phase values, compute an estimated distance between the imaged object and the signal receiver at least in part by mapping the plurality of phase values to a 2N-dimensional vector. Computing the estimated distance may further include computing a plurality of zeroes of a trigonometric polynomial. The trigonometric polynomial may be an orthogonal projection of the 2N-dimensional vector onto a curve along a flat torus. Computing the estimated distance may further include, for each of the plurality of zeroes, computing a respective geodesic distance between the 2N-dimensional vector and a point along the curve evaluated at the product of that zero and a least common multiple of the wavelengths. Computing the estimated distance may further include selecting and outputting, as the estimated distance, a shortest geodesic distance of the plurality of geodesic distances multiplied by the least common multiple.

In such an example, computing the plurality of zeroes of the trigonometric polynomial may include generating a complex companion matrix for the trigonometric polynomial and determining eigenvalues of the complex companion matrix.

In such an example, computing the eigenvalues of the complex companion matrix may include computing a plurality of Durand-Kerner iterations.

In such an example, the processor may be configured to compute the estimated distance for each pixel of a plurality of pixels of the signal receiver.

In such an example, the 2N-dimensional vector may include, for each phase value $\tilde{Y}_i$ of the plurality of phase values, a first element equal to $\cos(2\pi\tilde{Y}_i)$ and a second element equal to $\sin(2\pi\tilde{Y}_i)$.

In such an example, the curve along the flat torus may be given by an equation $$s_T(r) = \left[\cos\left(2\pi\frac{r}{\lambda_1}\right), \sin\left(2\pi\frac{r}{\lambda_1}\right), \ldots, \cos\left(2\pi\frac{r}{\lambda_N}\right), \sin\left(2\pi\frac{r}{\lambda_N}\right)\right]$$

where $\lambda_1 \ldots \lambda_N$ are the wavelengths and r is a real number between zero and the least common multiple of the wavelengths.

In such an example, the trigonometric polynomial may be given by an equation $$T_N(\hat{\beta}) = \sum_{i=1}^{N} v_i \sin(2\pi(v_i\hat{\beta} - \tilde{Y}_i)) = 0$$

where $\tilde{Y}_i$ are the phase values and $v_i$ are ratios of the least common multiple to the wavelengths.

In such an example, the electromagnetic signal may include a plurality of N emitted components that respectively have the N wavelengths. The plurality of N wavelengths may be selected such that a ratio of the least common multiple to a lowest wavelength of the plurality of N wavelengths is minimized.

In such an example, N may be between three and nine.

In such an example, the complex companion matrix may have dimensions 2M×2M, wherein M is a ratio of the least common multiple to a lowest wavelength of the plurality of N wavelengths.

Another example provides a method including, at a signal source, emitting an electromagnetic signal. The method may further include, at a signal receiver, receiving a reflected electromagnetic signal from an imaged object in a physical environment. The method may further include, for each of a plurality of N wavelengths, determining a phase value of a reflected component of the reflected electromagnetic signal having that wavelength. The method may further include, from the plurality of phase values, computing an estimated distance between the imaged object and the signal receiver at least in part by mapping the plurality of phase values to a 2N-dimensional vector. Computing the estimated distance may further include computing a plurality of zeroes of a trigonometric polynomial. The trigonometric polynomial may be an orthogonal projection of the 2N-dimensional vector onto a curve along a flat torus. Computing the estimated distance may further include, for each of the plurality of zeroes, computing a respective geodesic distance between the 2N-dimensional vector and a point along the curve evaluated at the product of that zero and a least common multiple of the wavelengths. Computing the estimated distance may further include selecting, as the estimated distance, a shortest geodesic distance of the plurality of geodesic distances multiplied by the least common multiple. The method may further include outputting the estimated distance.

In such an example, computing the plurality of zeroes of the trigonometric polynomial may include generating a complex companion matrix for the trigonometric polynomial and determining eigenvalues of the complex companion matrix.

In such an example, the 2N-dimensional vector may include, for each phase value $\tilde{Y}_i$ of the plurality of phase values, a first element equal to $\cos(2\pi\tilde{Y}_i)$ and a second element equal to $\sin(2\pi\tilde{Y}_i)$.

In such an example, the curve along the flat torus may be given by $$s_T(r) = \left[\cos\left(2\pi\frac{r}{\lambda_1}\right), \sin\left(2\pi\frac{r}{\lambda_1}\right), \ldots, \cos\left(2\pi\frac{r}{\lambda_N}\right), \sin\left(2\pi\frac{r}{\lambda_N}\right)\right]$$

where $\lambda_1 \ldots \lambda_N$ are the wavelengths and r is a real number between zero and the least common multiple of the wavelengths.

Another example provides an imaging system, including a signal source configured to emit an electromagnetic signal. The electromagnetic signal may include a plurality of N emitted components that respectively have N wavelengths. The imaging system may further include a signal receiver configured to receive a reflected electromagnetic signal from an imaged object in a physical environment. The imaging system may further include a processor configured to, for each of the plurality of N wavelengths, determine a phase value of a reflected component of the reflected electromagnetic signal having that wavelength. From the plurality of phase values, the processor may be further configured to compute an estimated distance between the imaged object and the signal receiver at least in part by computing a closest vector point between a vector of the plurality of phase values and an orthogonal projection matrix. The orthogonal projection matrix may encode an orthogonal projection onto a subspace orthogonal to a vector of a least common multiple of the N wavelengths divided by each of the N wavelengths. Computing the closest vector point may include, over a plurality of iterations in which a plurality of estimated elements of the closest vector point are updated, estimating a minimum value of a cost function of the plurality of estimated elements. Computing the estimated distance may further include computing a normalized distance based on the plurality of phase values, the closest vector point, and the vector of the least common multiple divided by each of the N wavelengths. Computing the estimated distance may further include computing the estimated distance based on the normalized distance and the least common multiple. The processor may be further configured to output the estimated distance.

In such an example, the orthogonal projection matrix may be a rank deficient positive semidefinite matrix.

In such an example, the orthogonal projection matrix may be computed with the equation $$Q = I - \frac{v\,v^T}{\|v\|^2}$$

wherein I is an N×N identity matrix and v is the vector of the least common multiple divided by each of the N wavelengths.

In such an example, the normalized distance is computed with the equation $$\hat{\beta}(\hat{z}) = \frac{(\tilde{y} - \hat{z})^T v}{v^T v}$$

wherein $\hat{\beta}(\hat{z})$ is the normalized distance, $\hat{z}$ is the closest vector point, $\tilde{y}$ is the vector of the plurality of phase values, and v is the vector of the least common multiple divided by each of the N wavelengths.

In such an example, the estimated distance may be computed with the equation $$\hat{r}_0 = P(\hat{\beta}(\hat{z}) - \lfloor \hat{\beta}(\hat{z}) \rfloor)$$

wherein $\hat{r}_0$ is the estimated distance, P is the least common multiple, and $\hat{\beta}(\hat{z})$ is the normalized distance.

In such an example, the plurality of N wavelengths may be selected such that a ratio of the least common multiple to a lowest wavelength of the plurality of N wavelengths is minimized.

It will be understood that the configurations and/or approaches described herein are exemplary in nature, and that these specific examples or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An imaging system comprising:
a signal source configured to emit an electromagnetic signal, wherein the electromagnetic signal comprises a plurality of N emitted components that respectively have N wavelengths;
a signal receiver configured to receive a reflected electromagnetic signal from an imaged object in a physical environment; and
a processor configured to:
for each wavelength of the N wavelengths, determine a phase value of a reflected component of the reflected electromagnetic signal having that wavelength;
from the plurality of phase values, compute an estimated distance between the imaged object and the signal receiver at least in part by:
mapping the plurality of phase values to a 2N-dimensional vector;
computing a plurality of zeroes of a trigonometric polynomial, wherein the trigonometric polynomial is an orthogonal projection of the 2N-dimensional vector onto a curve along a flat torus;
for each of the plurality of zeroes, computing a respective geodesic distance between the 2N-dimensional vector and a point along the curve evaluated at the product of that zero and a least common multiple of the wavelengths; and
selecting and outputting, as the estimated distance, a shortest geodesic distance of the plurality of geodesic distances multiplied by the least common multiple.

2. The imaging system of claim 1, wherein computing the plurality of zeroes of the trigonometric polynomial includes:
generating a complex companion matrix for the trigonometric polynomial; and
determining eigenvalues of the complex companion matrix.

3. The imaging system of claim 2, wherein computing the eigenvalues of the complex companion matrix includes computing a plurality of Durand-Kerner iterations.

4. The imaging system of claim 1, wherein the processor is configured to compute the estimated distance for each pixel of a plurality of pixels of the signal receiver.

5. The imaging system of claim 1, wherein the 2N-dimensional vector includes, for each phase value $\tilde{Y}_i$ of the plurality of phase values, a first element equal to $\cos(2\pi\tilde{Y}_i)$ and a second element equal to $\sin(2\pi\tilde{Y}_i)$.

6. The imaging system of claim 1, wherein the curve along the flat torus is given by an equation $$s_T(r) = \left[\cos\left(2\pi\frac{r}{\lambda_1}\right), \sin\left(2\pi\frac{r}{\lambda_1}\right), \ldots, \cos\left(2\pi\frac{r}{\lambda_N}\right), \sin\left(2\pi\frac{r}{\lambda_N}\right)\right]$$

where $\lambda_1 \ldots \lambda_N$ are the wavelengths and r is a real number between zero and the least common multiple of the wavelengths.

7. The imaging system of claim 6, wherein the trigonometric polynomial is given by an equation $$T_N(\hat{\beta}) = \sum_{i=1}^{N} v_i \sin(2\pi(v_i\hat{\beta} - \tilde{Y}_i)) = 0$$

where $\tilde{Y}_i$ are the phase values and $v_i$ are ratios of the least common multiple to the wavelengths.

8. The imaging system of claim 1, wherein:
the N wavelengths are selected such that a ratio of the least common multiple to a lowest wavelength of the N wavelengths is minimized.

9. The imaging system of claim 8, wherein N is between three and nine.

10. The imaging system of claim 1, wherein the complex companion matrix has dimensions 2M×2M, wherein M is a ratio of the least common multiple to a lowest wavelength of the N wavelengths.

11. A method comprising:
at a signal source, emitting an electromagnetic signal, wherein the electromagnetic signal comprises a plurality of N emitted components that respectively have N wavelengths;
at a signal receiver, receiving a reflected electromagnetic signal from an imaged object in a physical environment;
for each wavelength of the N wavelengths, determining a phase value of a reflected component of the reflected electromagnetic signal having that wavelength;
from the plurality of phase values, computing an estimated distance between the imaged object and the signal receiver at least in part by:
mapping the plurality of phase values to a 2N-dimensional vector;
computing a plurality of zeroes of a trigonometric polynomial, wherein the trigonometric polynomial is an orthogonal projection of the 2N-dimensional vector onto a curve along a flat torus;
for each of the plurality of zeroes, computing a respective geodesic distance between the 2N-dimensional vector and a point along the curve evaluated at the product of that zero and a least common multiple of the wavelengths; and
selecting, as the estimated distance, a shortest geodesic distance of the plurality of geodesic distances multiplied by the least common multiple; and
outputting the estimated distance.

12. The method of claim 11, wherein computing the plurality of zeroes of the trigonometric polynomial includes:
generating a complex companion matrix for the trigonometric polynomial; and
determining eigenvalues of the complex companion matrix.

13. The method of claim 11, wherein the 2N-dimensional vector includes, for each phase value $\tilde{Y}_i$ of the plurality of phase values, a first element equal to $\cos(2\pi\tilde{Y}_i)$ and a second element equal to $\sin(2\pi\tilde{Y}_i)$.

14. The method of claim 11, wherein the curve along the flat torus is given by $$s_T(r) = \left[\cos\left(2\pi\frac{r}{\lambda_1}\right), \sin\left(2\pi\frac{r}{\lambda_1}\right), \ldots, \cos\left(2\pi\frac{r}{\lambda_N}\right), \sin\left(2\pi\frac{r}{\lambda_N}\right)\right]$$

where $\lambda_1 \ldots \lambda_N$ are the wavelengths and r is a real number between zero and the least common multiple of the wavelengths.

15. An imaging system comprising:
a signal source configured to emit an electromagnetic signal, wherein the electromagnetic signal includes a plurality of N emitted components that respectively have N wavelengths;
a signal receiver configured to receive a reflected electromagnetic signal from an imaged object in a physical environment; and
a processor configured to:
for each of the plurality of N wavelengths, determine a phase value of a reflected component of the reflected electromagnetic signal having that wavelength;
from the plurality of phase values, compute an estimated distance between the imaged object and the signal receiver at least in part by:
computing a closest vector point between a vector of the plurality of phase values and an orthogonal projection matrix, wherein:
the orthogonal projection matrix encodes an orthogonal projection onto a subspace orthogonal to a vector of a least common multiple of the N wavelengths divided by each of the N wavelengths, and
computing the closest vector point includes, over a plurality of iterations in which a plurality of estimated elements of the closest vector point are updated, estimating a minimum value of a cost function of the plurality of estimated elements;
computing a normalized distance based on the plurality of phase values, the closest vector point, and the vector of the least common multiple divided by each of the N wavelengths;
computing the estimated distance based on the normalized distance and the least common multiple; and
output the estimated distance.

16. The imaging system of claim 15, wherein the orthogonal projection matrix is a rank deficient positive semidefinite matrix.

17. The imaging system of claim 15, wherein the orthogonal projection matrix is computed with the equation $$Q = I - \frac{v\,v^T}{\|v\|^2}$$

wherein I is an N×N identity matrix and v is the vector of the least common multiple divided by each of the N wavelengths.

18. The imaging system of claim 15, wherein the normalized distance is computed with the equation $$\hat{\beta}(\hat{z}) = \frac{(\tilde{y} - \hat{z})^T v}{v^T v}$$

wherein $\hat{\beta}(\hat{z})$ is the normalized distance, $\hat{z}$ is the closest vector point, $\tilde{y}$ is the vector of the plurality of phase values, and v is the vector of the least common multiple divided by each of the N wavelengths.

19. The imaging system of claim 15, wherein the estimated distance is computed with the equation $$r_0 = P(\hat{\beta}(\hat{z}) - \lfloor \hat{\beta}(\hat{z}) \rfloor)$$

wherein $\hat{r}_0$ is the estimated distance, P is the least common multiple, and $\hat{\beta}(\hat{z})$ is the normalized distance.

20. The imaging system of claim 15, wherein the plurality of N wavelengths are selected such that a ratio of the least common multiple to a lowest wavelength of the plurality of N wavelengths is minimized.

* * * * *